J. V. ROWLETT.

ROLLER SKATE.

No. 10,570. Reissued Mar. 10, 1885.

Witnesses,
J. F. Recse
Aldison H. Study.

Inventor,
Jacob V. Rowlett

N. PETERS, Photo-Lithographer, Washington, D. C.

UNITED STATES PATENT OFFICE.

JACOB V. ROWLETT, OF RICHMOND, INDIANA.

ROLLER-SKATE.

SPECIFICATION forming part of Reissued Letters Patent No. 10,570, dated March 10, 1885.

Original No. 296,758, dated April 8, 1884. Application for reissue filed September 4, 1884.

*To all whom it may concern:*

Be it known that I, JACOB V. ROWLETT, a citizen of the United States, residing at Richmond, in the county of Wayne and State of Indiana, have invented certain new and useful Improvements in Roller-Skates, whereof the following is a specification, reference being had therein to the accompanying drawings.

My invention relates to that class of devices known as "roller-skates," and has for its object strength, durability, cheapness, lightness, and efficiency. The device used enables the skater to adjust at will the tension on the elastic spring, which tension is produced by the adjustment of the post, by which, together with an eye-pivot secured by pin and washer, the truck-hanger is attached to the bracket, which is fastened to the foot-piece. The hanger may be removed by the skater by simply withdrawing the pin without taking the skate from the foot. The washer surrounding the post has a lug to secure a pin, as shown, or a hole into which a pin may pass. Any other method of holding the pin in place may be employed, though I prefer the lug.

Figure 1:
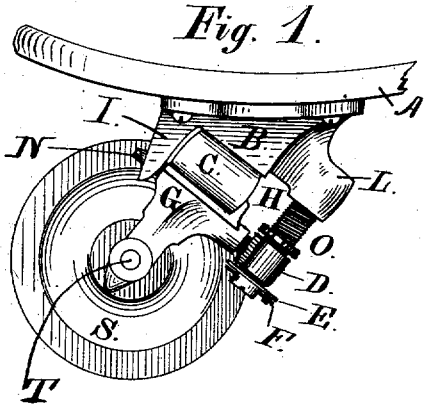
Figure 2:
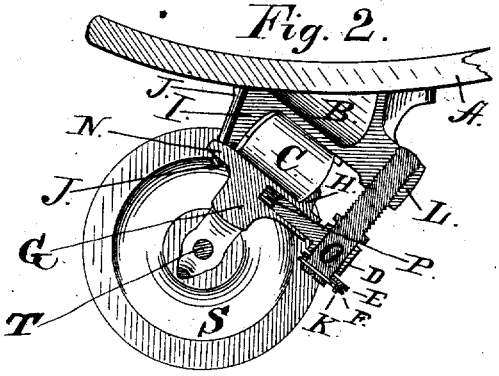
Figure 3:
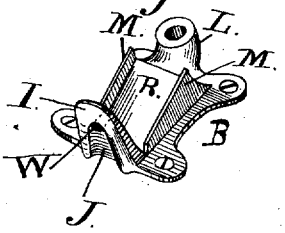
Figure 4:
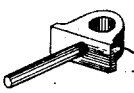
Figure 5:
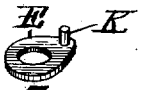
Figure 7:
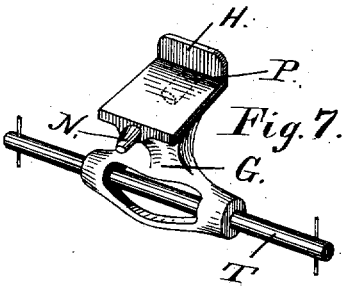
Figure 6:
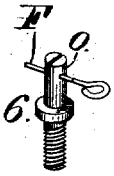

In the accompanying drawings, Figure 1 is a side elevation of the front part of a roller-skate, with my improvements applied thereto. Fig. 2 is a vertical longitudinal section of the same. Fig. 3 is a perspective view of the bracket inverted. Fig. 4 is a perspective view of the eye-pivot. Fig. 5 is a perspective view of the washer with its lug used in conjunction with the pin. Fig. 6 is a perspective view of the adjustable post, with pin inserted near its outer and lower end. Fig. 7 is a perspective view of the hanger to which the rollers are attached, and also having a flange or rib upon its upper surface.

Similar letters of reference indicate corresponding parts.

A represents the foot-piece of a skate, as shown in Figs. 1 and 2.

B represents the metal bracket, as shown in Figs. 1, 2, and 3.

I represents the post, and L represents a support, as shown in Figs. 1, 2, and 3.

O represents the adjustable post, having a hole in its end to receive the pin *f*, as shown in Figs. 1, 2, and 6.

R represents the seat or under face of bracket B, as shown in Fig. 3.

M M represent the flanges on bracket B, as shown in Fig. 3.

D represents the eye-pivot, as shown in Figs. 1, 2, and 4.

E represents the washer, as shown in Figs. 1 and 2, and more fully in Fig. 5.

K represents the lug on washer E, as shown in Figs. 2 and 5.

F represents the pin engaging with the lower end of post O.

G represents the hanger. N denotes the pivot on one end of said hanger, and P indicates the opening formed in the other end of said hanger, the latter being shown in dotted lines in Fig. 7.

S represents the rollers, and T the axle for said rollers.

H represents the flange formed upon one end of the hanger, which co-operates with the flanges M M to form a seat for the elastic spring C.

J J represent the grooves in post I, as shown in Figs. 2 and 3.

W represents the opening in post I, which receives pivot N of the hanger.

The bracket B is constructed with post I, provided with grooves J J, and having the hole W for the reception of the pivot N of hanger G. It also has the part or boss L to receive the post O. The under face, R, is provided with flanges M M, forming part of the seat for the elastic spring C.

The hanger G is provided with a flange, H, completing the seat for the elastic spring C when said hanger is adjusted, as shown in Figs. 1 and 2. The hanger G is also provided with a pivot, N, to be inserted and to rest in the hole W in the post I. The hanger G is further provided with an opening or socket, P, to receive the pin bearing upon the eye-pivot D.

The eye-pivot D is provided with a pin-bearing running at right angles with the eye or hole, so that when placed upon the post O, with its pin-bearing inserted in the opening or socket P in the hanger G, it will make a perfect bearing, and also allow the hanger G to have a rocking motion.

The washer E is provided with the lug K, to hold in place the pin F when inserted through the post O. By this mode of fastening the eye-pivot to the post O and the hanger, the post may, with the eye-pivot thereon, be adjusted toward and from the bracket B, thereby pressing the hanger G against the elastic spring, whereby the elastic resistance to the rocking or tilting movement of the foot-plate may be varied to suit the circumstances of each case.

Having thus described my invention, what I claim, and desire to secure by Letters Patent of the United States, is—

1. In a roller-skate, the combination, with a bracket attached to the foot-plate and having a boss or projection upon one end and a post upon the other, both in substantially the median line of the foot-plate, of a hanger having a pivot engaging with the post, and a post engaging with the boss upon said bracket, the latter post being adjustable in a direction substantially at right angles with the axis of the hanger-pivot, and a spring-cushion interposed between said bracket and hanger, substantially as specified.

2. In a roller-skate, the combination, with the oscillating hanger, the rigid post I, and the eye-pivot D, of the spring-cushion C, interposed between said hanger and a bracket mounted upon the foot plate, and means, substantially as specified, for adjusting the eye-pivot to vary the tension of the spring-cushion, substantially as set forth.

3. In a roller-skate, the combination, with a bracket, B, having a boss, L, and provided with flanges M M, of the post I, the hanger G, having a flange, H, and a pivot, N, and the adjustable post O, having an eye-pivot, D, engaging with the hanger, substantially as specified.

4. In a roller-skate, the combination, with the adjustable post O, having pin F, of the bracket B, supporting one end of the hanger, the eye-pivot D, and the hanger G, substantially as specified.

5. In a roller-skate, the combination, with the adjustable post O and pin F, of the bracket B, supporting one end of the hanger, the eye-pivot D and washer E, the latter having a lug, K, and the hanger G, having a pivot on one end and an opening in the other, substantially as specified.

6. In a roller-skate, the combination, with a foot-piece, A, and a bracket, B, having a post, I, and flanges M M, of the adjustable post O, having pin F, the eye-pivot D, having a pin-bearing, the washer E, having a lug, K, and the hanger G, having a flange, H, pivot N, and opening P, substantially as specified.

7. In a roller-skate, the combination, with an adjustable hanger having a spring-cushion interposed between it and the bracket, of an eye pivotally connected with one end of said hanger, and an adjustable post engaging with said eye and with the bracket mounted upon the foot-plate, substantially as specified.

JACOB V. ROWLETT.

Witnesses:
F. B. HUNT,
W. A. PEELLE.